United States Patent [19]

Poyser

[11] Patent Number: 4,623,265
[45] Date of Patent: Nov. 18, 1986

[54] TRANSFORMER HOT-SPOT TEMPERATURE MONITOR

[75] Inventor: Thomas D. Poyser, McCandless Twp., Allegheny County, Pa.

[73] Assignee: Westinghouse Electric Corp., Pittsburgh, Pa.

[21] Appl. No.: 654,624

[22] Filed: Sep. 26, 1984

[51] Int. Cl.$^4$ .............................................. G01K 1/12
[52] U.S. Cl. .................................. 374/152; 340/646; 361/37
[58] Field of Search ........................ 374/152; 361/37; 340/646

[56] References Cited

U.S. PATENT DOCUMENTS

| | | | |
|---|---|---|---|
| 2,704,841 | 3/1955 | Van Ryan | 374/152 |
| 2,834,920 | 5/1958 | Lennox et al. | 361/37 |
| 3,793,559 | 2/1974 | Ristuccia | 361/37 |
| 3,797,314 | 3/1974 | Lampe et al. | 374/152 |
| 4,092,864 | 6/1978 | Romanowski | 374/152 |
| 4,102,185 | 7/1978 | Thompson et al. | 374/152 |
| 4,140,899 | 2/1979 | Conway | 374/152 |

FOREIGN PATENT DOCUMENTS 815525  3/1981  U.S.S.R. .............................. 374/152

Primary Examiner—Charles Frankfort
Assistant Examiner—Thomas B. Will
Attorney, Agent, or Firm—William D. Lanyi

[57] ABSTRACT

A hot-spot temperature monitor for determining the hot-spot temperature of a transformer. The hot-spot temperature monitor determines the largest current flowing in the transformer and using this value calculates a temperature gradient. The temperature gradient represents the difference in temperature between the hot spot and the top-oil temperature. The top-oil temperature is also measured. The hot-spot temperature is calculated by adding the temperature gradient to the top-oil temperature. The hot-spot temperature sensor controls the transformer cooling units and can activate various alarms and indicators as desired.

4 Claims, 3 Drawing Figures

TRANSFORMER HOT-SPOT TEMPERATURE MONITOR

BACKGROUND OF THE INVENTION

1. Field of the Invention

This invention relates generally to a method and apparatus for determining the temperature of the hot spot in a transformer, and more particularly, to such a method and apparatus employing the transformer current and top-oil temperature to determine the hot-spot temperature.

2. Description of the Prior Art

The economics of utility operations require that all components be operated at their maximum rating consistent with a satisfactory operating life. For transformers, the generation of heat due to $I^2R$ and eddy current losses and the efficiency of the winding cooling system determines the maximum transformer rating. The generation of heat in a transformer is not homogeneous. Local hot spots are produced by imperfections in materials and the manufacturing process. The effect of these hot spots is to accelerate degradation of the insulating material and cause premature failure of the transformer.

Without real-time monitoring of the transformer hot-spot temperature, the transformer is operated below its theoretical rating to mitigate temperature degradation of the insulating materials. Continuous monitoring of the transformer hot spot allows the transformer to be safely operated much closer to the critical temperature. In effect, this greatly improves the electric utility's return on capital investment by allowing expensive transformers to be operated at a significantly higher capacity with no appreciable increase in capital equipment expense. Accurate temperature monitoring, while the transformer is operating, also provides the basis for estimating the remaining thermal life of the insulation, given a known loading history. Typically, a transformer is designed in such a way that, at rated load, the temperature of any winding is approximately 65° C. above the ambient air temperature. In this design process, one of the transformer's windings typically reaches this temperature value before the other windings do. This particular winding will then be used as the basis of the calculated hot spot per ANSI loading procedures known to those skilled in the art. Accurate hot-spot monitoring could also allow possible future redesign of coil cooling features to provide a more uniform temperature distribution.

Several techniques are known in the art for hot-spot temperature monitoring, including: a thermometer producing an electrical signal representative of the hot-spot temperature; an acoustic-signal generator using a mechanical resonator with the resonator frequency dependent on temperature and a separate detector responsive to the acoustic signal; a device for producing an electromagnetic signal having a frequency functionally related to the hot-spot temperature and a separate frequency detector; and an optical fiber with a plurality of cores where the cross-talk between cores is a function of the hot-spot temperature.

In another well-known technique, the hot-spot temperature monitor is mounted away from the transformer hot spot. The monitor includes a mechanical dial indicator with a liquid-filled capillary sensor, a well into which the sensor is placed, a heater inside the well, a current transformer to heat the heater, and a current balancing auto-transformer to adjust the current in the heater. The helical coil in the dial indicator assembly is unwound (or wound) by the contracting (or expanding) liquid in the filled capillary tube. A shaft connected to the center of the helical coil rotates, thus turning the indicating pointer and producing the hot-spot temperature signal. Control of cooling equipment is derived from adjustable cams on the shaft; these cams trip snap action switches to activate and deactivate the cooling equipment.

All of these prior art techniques exhibit at least one or more disadvantages including expense and complexity of electronics. For some of these techniques, it is necessary to run an electrical conductor from the temperature sensor through the transformer insulation, windings, and oil to the exterior of the transformer. This conductor is exposed to both high electric and magnetic stresses. The mechanical dial indicator technique is susceptible to transformer vibration, loss of liquid in the capillary tube, wide variations, in dial indication, and it lacks a fail-safe mode of operation. In general, the major problem with hot-spot temperature sensing is the hostile environment within the transformer through which the temperature data must pass to the transformer exterior.

SUMMARY OF THE INVENTION

A method and apparatus providing continuous on-line sensing of a transformer's hot-spot temperature is disclosed. The hot-spot temperature monitor measures the current in each winding of the transformer and determines which of the currents is largest. Using the largest current value, the hot-spot temperature monitor determines the temperature gradient between the top-oil temperature and the hot-spot temperature for this value of current. The gradient can be determined from a look-up table or mathematically calculated using data collected and analyzed during manufacture of the transformer. The hot-spot temperature monitor also measures the top-oil temperature. The top-oil temperature and the hot-spot gradient are summed to produce the hot-spot temperature. The hot-spot temperature can be compared with predetermined temperature limits to control the transformer cooling equipment and activate various alarms and indicators.

The apparatus of the present invention includes at least one oil temperature sensor, at least one current transformer, and a single-board or single-chip microcomputer. This provides a more reliable, lower cost system than the prior art, with fewer components, limited wiring, a fail-safe mode of operating the cooling equipment, and the capability of being retrofitted on existing transformers.

BRIEF DESCRIPTION OF THE DRAWINGS

The present invention may be better understood, and the further advantages and uses thereof more readily apparent, when considered in view of the following detailed description of exemplary embodiments, taken with the accompanying drawings in which.

DESCRIPTION OF THE PREFERRED EMBODIMENTS

Figure 1:
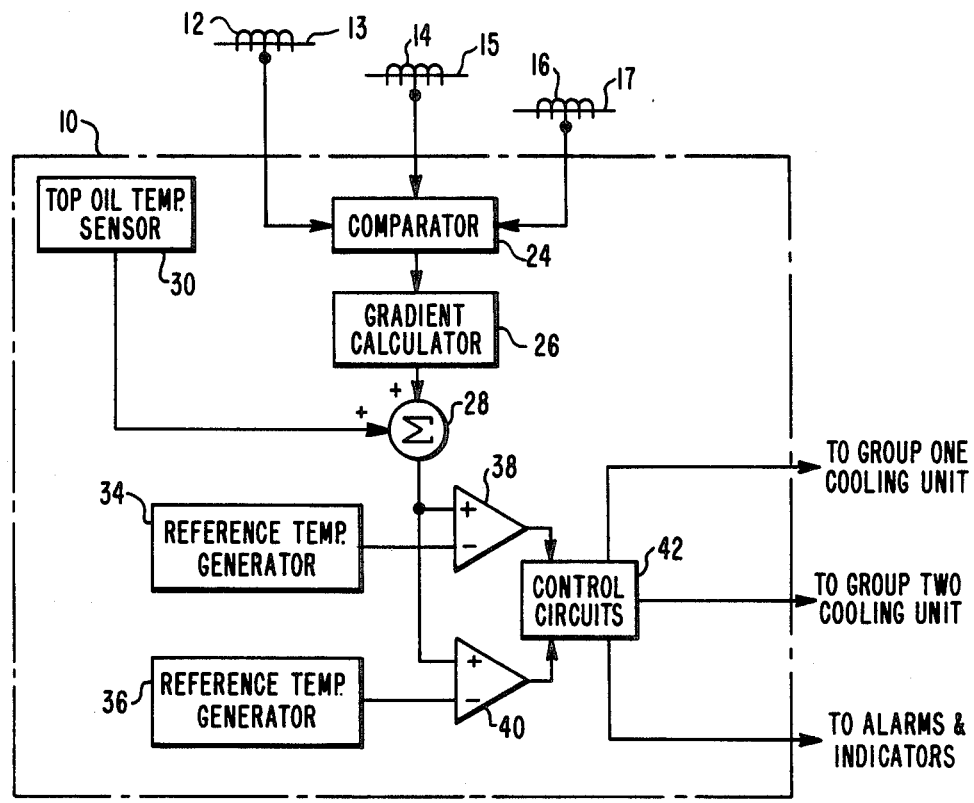
FIG. 1 is a block diagram of a first embodiment of a hot-spot temperature monitor constructed according to the teachings of the present invention.

Turning to FIG. 1, there is shown a hot-spot temperature monitor 10 constructed in accordance with the present invention. In FIG. 1, a current transformer 12 is located proximate a winding 13 of the monitored transformer (not shown in FIG. 1) for producing a signal representative of the current flowing therein. A current transformer 14 is located proximate a winding 15 for producing a signal representative of the current flowing therein. Also, a current transformer 16 is located proximate a winding 17 for producing a signal representative of the current flowing therein. The signals from the current transformers 12, 14, and 16 are input to a comparator 24. The comparator 24 produces a signal representative of the largest of the three currents flowing through the windings 13, 15 and 17. The signal from the comparator 24 is input to a gradient calculator 26. Using the largest current value, the gradient calculator 26 calculates the temperature difference between the transformer hot-spot and the top-oil temperature. The gradient calculation is based on well-known industry standards and the transformer design parameters analyzed during design and construction of the monitored transformer. For example, a formula that is provided by the ANSI Loading Guide is:

$$GRAD = T_1 * K^{1.6} \qquad (1)$$

where GRAD represents the temperature gradient between the measured top oil temperature and the winding hot spot temperature. $T_1$ is the average hot spot temperature rise over the average top oil temperature at the transformer's rated current and K is the ratio between measured current and rated current.

In the embodiment of FIG. 1 the current is measured in three windings of the monitored transformer. In another embodiment, the current can be measured in only the winding in which the hot-spot occurs, thus eliminating two current transformers and the comparator 24. The hot-spot temperature monitor 10 can be configured to measure the current in any number of windings of the monitored transformer. If more than one winding current is measured the comparator 24 is required. Also, the hot-spot temperature monitor 24 can be used for monitoring single-phase or three-phase transformers.

A top-oil temperature sensor 30 is located in the top oil region in a wall-mounted well (not shown in FIG. 1). The well is located as close as possible to the top cooler valves associated with the cooling units of the transformer. The top-oil temperature sensor 30 is calibrated using well-known industry standards to produce a signal representative of the temperature of the top oil volume. The gradient signal from the gradient calculator 26 is added to the top oil temperature signal from the top oil temperature sensor 30 in a summer 28. The sum signal produced in the summer 28 represents the hot-spot temperature of the transformer.

To determine if the hot-spot temperature is excessive, the signal from the summer 28 is input to a non-inverting input terminal of a comparator 38 and a non-inverting input terminal of a comparator 40. A first reference temperature signal is produced by a reference temperature generator 34 and input to an inverting input terminal of the comparator 38. A second reference temperature is produced by a reference temperature generator 36 and input to an inverting input terminal of the comparator 40. Depending on the predetermined value of the first and second reference temperature signals, the comparator 38 and the comparator 40 produce first and second control signals, respectively, when the hot-spot temperature exceeds the first or second reference temperatures. The first and second control signals are input to control circuits 42 for controlling the group one and group two cooling units associated with the transformer. The control circuits 42 also can activate alarms and indicators to advise of an excessive hot-spot temperature. The control circuits use techniques well-known in the industry to activate the group one and group two cooling units and the various alarms and indicators.

In another embodiment of the present invention, not shown in FIG. 1, additional comparators like the comparators 38 and 40, and additional reference temperature generators, like the reference temperature generators 34 and 36, can be included to provide additional control of the cooling units or indications of the hot-spot temperature. For example, indicators could provide information of the range of the hot-spot temperature, i.e., from slightly above design limits to far in excess of design limits.

Figure 2:
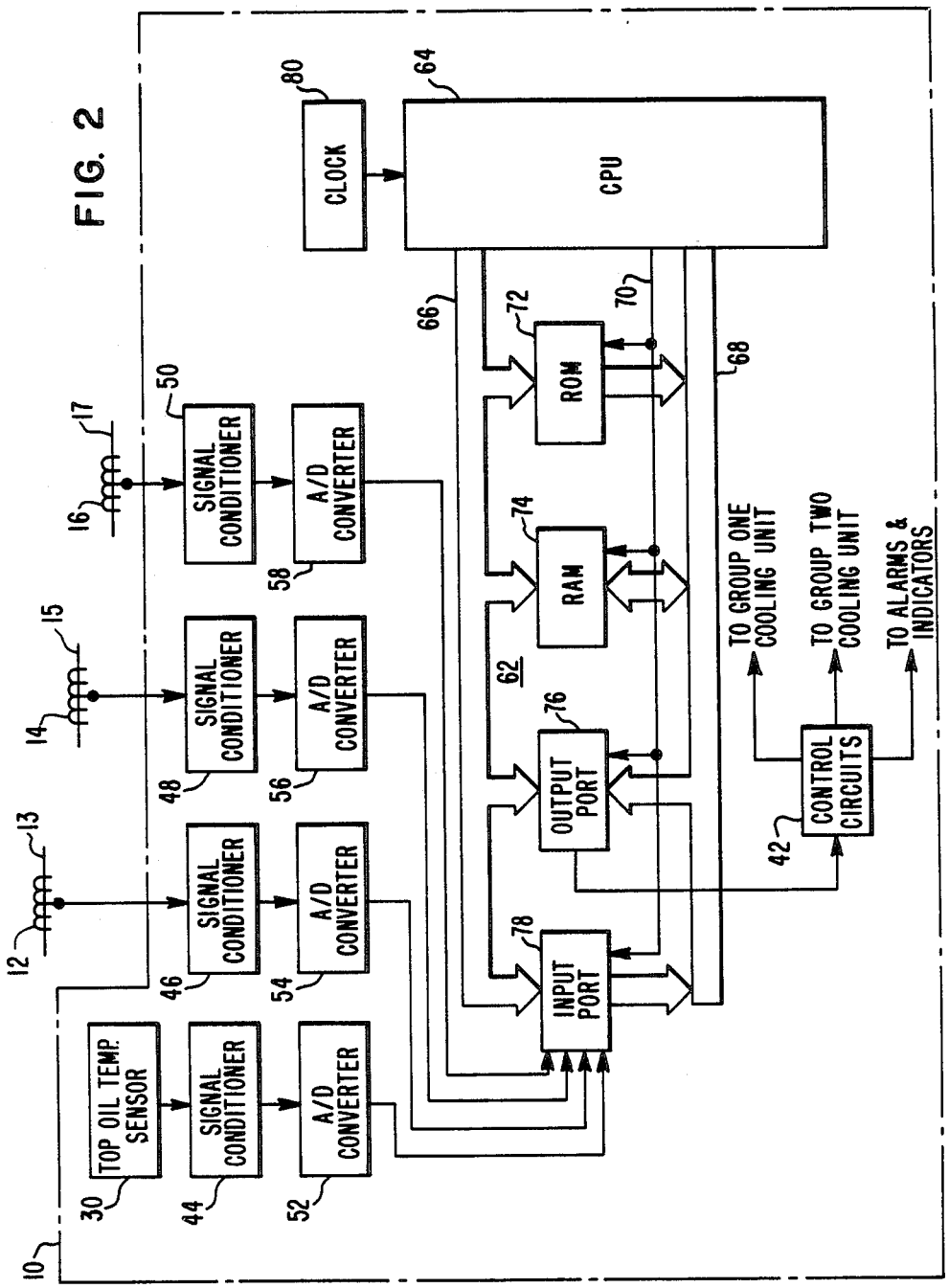
FIG. 2 is a block diagram of a second embodiment of the hot-spot temperature monitor constructed according to the teachings of the present invention.

FIG. 2 illustrates, in block diagram, form a second embodiment of the hot-spot temperature monitor 10. The components of FIG. 2 are identical in structure and function to the components bearing identical reference characters in FIG. 1. The signals from the current transformers 12, 14, and 16 are input to, respectively, signal conditioners 46, 48, and 50. Also, the signal from the top-oil temperature sensor 30 is input to a signal conditioner 44 which converts the resistance, current, or voltage signal to a dc signal. The signal conditioners 46, 48, and 50 convert the ac input signals to dc signals. The dc signals from the signal conditioners 44, 46, 48, and 50 are input respectively to analog-to-digital converters 52, 54, 56, and 58. The analog-to-digital converters 52, 54, 56, and 58 convert the dc signals to digital form.

The embodiment of FIG. 2 also includes a microcomputer 62. Specifically, the microcomputer 62 includes a central processing unit (CPU) 64, a read-only memory (ROM) 72, a random-access memory (RAM) 74, an output port 76, and an input port 78. The CPU 64 communicates via an address bus 66 with the ROM 72, the RAM 74, the output port 76, and the input port 78. Through control lines 70, the CPU 64 controls operation of the ROM 72, the RAM 74, the output port 76, and the input port 78. Data is transferred bidirectionally on a data bus 68 connecting the CPU 64, the ROM 72, the RAM 74, the output port 76, and the input port 78. A clock 80 provides appropriate timing signals to the CPU 64.

The signals from the analog-to-digital converters 52, 54, 56, and 58 are input to the input ports 78. The control circuits 42 are responsive to a signal from the output port 76 for controlling the group one and group two cooling units and various alarms and indicators. The microcomputer 62 periodically scans the signals input to the input port 78, updates the alarms and indicators, and controls the cooling equipment via the output port 76. In one embodiment, the top-oil temperature and the three hot-spot temperatures (one for each winding of the transformer) can be displayed using signals from the output port 76 via the control circuits 42.

Figure 3:
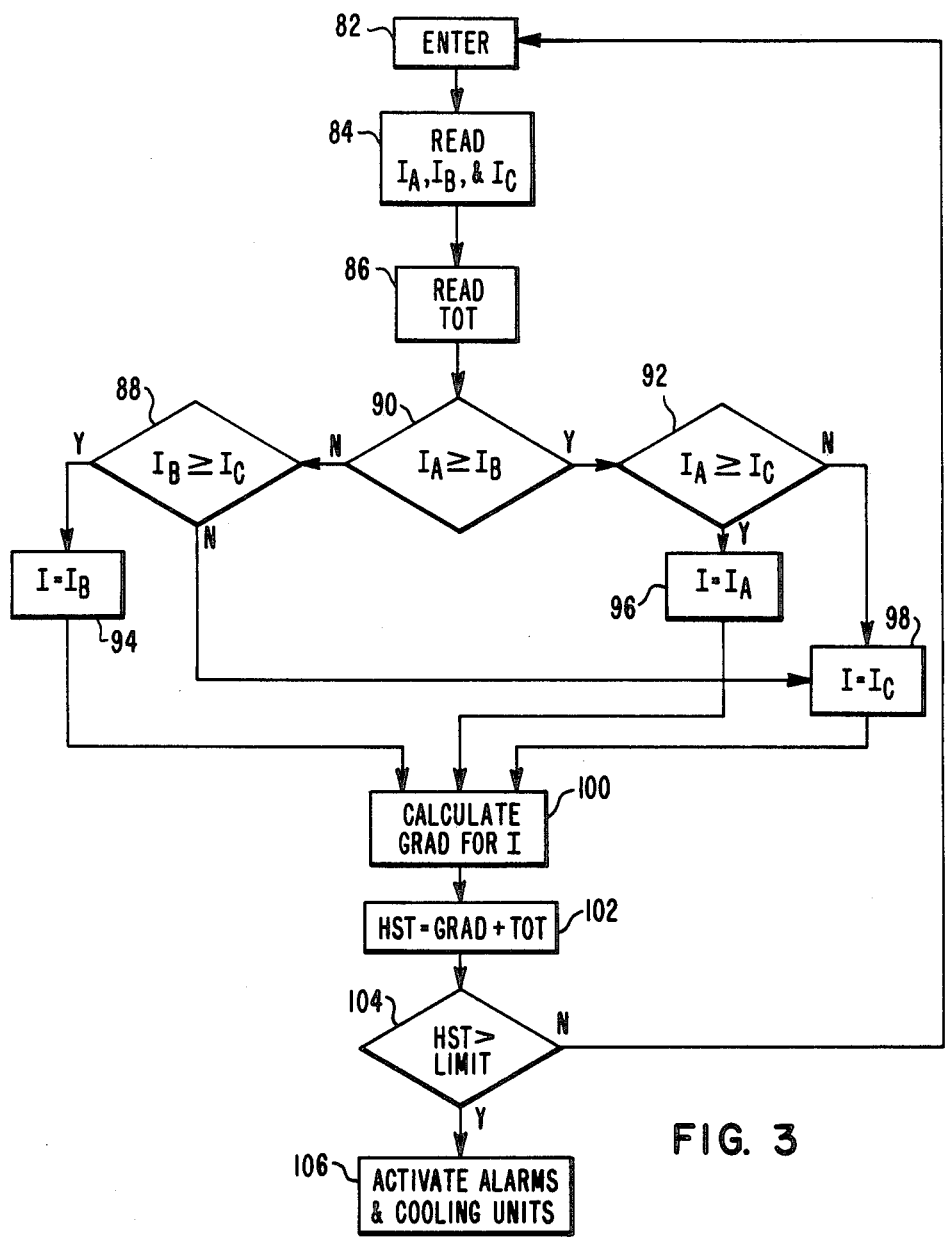
FIG. 3 is a flow chart illustrating the programming of the microcomputer of FIG. 2.

FIG. 3 illustrates one implementation for operating the microcomputer 62 of FIG. 2. This implementation involves a software flow chart continuously processed by the microcomputer 62 to read the input values and provide signals to the control circuits 42.

The flow chart of FIG. 3 begins at an entry step 82 followed by a step 84 where the three phase currents are read. The phase currents are designated $I_A$, $I_B$, and $I_C$ in FIG. 3. At a step 86, the top-oil temperature from the top-oil temperature sensor 30 is read by the microcomputer 62. At a decision step 90, the phase A current is compared to the phase B current. If the phase A current is greater than or equal to the phase B current, processing continues to a decision step 92. At the decision step 92, the phase A current is compared with the phase C current. If the phase A current is greater than or equal to the phase C current, processing moves to a step 96 where the variable I is set equal to the phase A current. If the result of the decision step 92 is negative, processing moves to a step 98 where the variable I is set equal to the phase C current. If the result of the decision step 90 is negative, processing moves to a decision step 88 where the phase B current is compared with the phase C current. If the phase B current is greater than or equal to the phase C current, processing moves to a step 94 where the variable I is set equal to the phase B current. If the result of the decision step 88 is negative, processing moves to the step 98 where the variable I is set equal to the phase C current.

Processing then moves to a step 100 where the microcomputer 62 calculates the temperature gradient for the variable I. At a step 102, the hot-spot temperature is calculated as the sum of the gradient and the top oil temperature. The step 102 is followed by a decision step 104 where the hot-spot temperature is compared with various predetermined limits stored in the microcomputer 62. If the hot-spot temperature does not exceed the predetermined limit, processing returns to the entry step 82 and the cycle begins again. If the hot-spot limit is exceeded, processing moves from the decision step 104 to a step 106 where alarms and the transformer cooling units are activated, in a manner well-known in the art.

The discussion of the flow chart of FIG. 3 is intended for purposes of illustration and not limitation. It is anticipated that alternative embodiments of the present invention may be conceived wherein the location of the instructions for performing the monitoring is different from that shown in the discussed flow chart. These alternative embodiments are believed to fall within the spirit and scope of the present invention as claimed herein.

As illustrated in FIG. 1, the hot-spot temperature monitor 10 can also be implemented using traditional hard-wired techniques. The software running the microcomputer 62 could also include well-known self-diagnostics to check the condition of the various elements associated with the hot-spot temperature sensor 10. If problems are diagnosed, the hot-spot temperature monitor 10 would revert to a fail-safe mode of controlling the cooling equipment and also provide an indication of needed maintenance on the hot-spot temperature monitor 10.

The present invention for measuring the hot-spot temperature can also be used in the apparatus for monitoring transformers disclosed in commonly-assigned U.S. patent application Ser. No. 595,074 filed Mar. 30, 1984. Specifically, the present invention could be used as the hot-spot temperature sensor in that patent application.

What is claimed is:

1. A hot-spot temperature apparatus for determining the hot-spot temperature of a transformer, wherein the transformer is adapted for connection to a power source and wherein the transformer includes a magnetic core, electrical winding means disposed in inductive relation with the magnetic core for establishing a magnetic flux therein, said winding means having one or more phase windings, and a cooling system for circulating a coolant, said hot-spot temperature apparatus comprising:

means for determining the phase winding having the largest current in the electrical winding means and for producing a signal representative thereof;

means responsive to said signal for deriving a first value representing an average hot-spot temperature rise over an average top-oil temperature at a rated current of said transformer by using a predetermined relationship between the average hot-spot temperature rise over the average top-oil temperature at the rated current of said transformer wherein said first value is a function of the largest current in the electrical winding means;

means for calculating a temperature gradient, wherein said temperature gradient is a function of said first value;

means for determining coolant temperature at a preselected location proximate the top portion of said coolant; and means for adding said temperature gradient and said coolant temperature for determining the hot-spot temperature.

2. A method for determining the hot-spot temperature of a transformer, wherein the transformer includes electrical winding means having one or more phase windings and is adapted for connection to a power source, and wherein the transformer includes a cooling system for circulating a coolant, said method comprising the steps of:

determining the phase winding having the largest current in the electrical winding means and producing a signal representative thereof;

calculating a temperature gradient, wherein said temperature gradient is a function of the largest current in the electrical winding means;

determining coolant temperature at a preselected location proximate the top portion of said coolant;

adding said temperature gradient and said coolant temperature for deriving the hot-spot temperature.

3. An apparatus for measuring the hot-spot temperature of an oil-cooled transformer having one or more phase windings, comprising:

means for measuring the current flowing through each of said phase windings;

means for determining the single phase winding of said one or more phase windings which has the highest current flowing therethrough;

means for determining a temperature gradient, said temperature gradient is a function of said single phase winding and the measured current flowing therethrough;

means for measuring the oil temperature at a predetermined location within said oil-cooled transformer;

means for calculating the sum of said oil temperature and said temperature gradient, said sum being the hot-spot temperature of said transformer.

4. The hot-spot temperature apparatus of claim 3 wherein the means for determining said temperature gradient includes a look-up table including current values and a temperature gradient for each current value, and wherein the temperature gradient is determined by using the largest current as the current value in said table.

* * * * *